US008649440B2

(12) United States Patent
Huynh-Thu et al.

(10) Patent No.: US 8,649,440 B2
(45) Date of Patent: Feb. 11, 2014

(54) METHOD AND APPARATUS FOR IMAGE SIGNAL NORMALISATION

(75) Inventors: Quan Huynh-Thu, Ipswich (GB); Benjamin Pernot, Ipswich (GB)

(73) Assignee: Psytechnics Limited (GB)

( * ) Notice: Subject to any disclaimer, the term of this patent is extended or adjusted under 35 U.S.C. 154(b) by 427 days.

(21) Appl. No.: 12/427,195

(22) Filed: Apr. 21, 2009

(65) Prior Publication Data

US 2009/0273677 A1    Nov. 5, 2009

(30) Foreign Application Priority Data

Apr. 24, 2008    (EP) .................................... 08103718

(51) Int. Cl.
*H04N 17/00*    (2006.01)
*H04N 7/12*    (2006.01)

(52) U.S. Cl.
USPC .................................................... 375/240.25

(58) Field of Classification Search
None
See application file for complete search history.

(56) References Cited

U.S. PATENT DOCUMENTS

| | | | |
|---|---|---|---|
| 5,805,213 A | 9/1998 | Spaulding et al. | |
| 6,433,838 B1 * | 8/2002 | Chen | 348/674 |
| 6,690,839 B1 | 2/2004 | Ferguson | |
| 2005/0074171 A1 | 4/2005 | Higashijima et al. | 382/232 |
| 2006/0125771 A1 * | 6/2006 | Inuzuka et al. | 345/102 |
| 2007/0088516 A1 | 4/2007 | Wolf et al. | |
| 2007/0211800 A1 * | 9/2007 | Shi et al. | 375/240.16 |
| 2008/0077543 A1 * | 3/2008 | Kobayashi et al. | 706/12 |
| 2008/0219503 A1 * | 9/2008 | Di Venuto et al. | 382/103 |
| 2009/0262868 A1 * | 10/2009 | Mohammed et al. | 375/340 |

FOREIGN PATENT DOCUMENTS

GB    2 348 700    10/2000

OTHER PUBLICATIONS

Pinson et al., *A New Standardized Method for Objectively Measuring Video Quality*, IEEE Transactions on Broadcasting, vol. 50, No. 3, Sep. 2004, pp. 312-322.
Pinson, M.N., et al., "Reduced Reference Video Calibration Algorighms," U.S. Department of Commerce, National Telecommunications and Information Administration, *NTIA Report TR-08-433b*, Nov. 2007, fifty-two pages.
European Extended Search Report, European Application No. 08103718.6, Oct. 7, 2008, 7 pages.
European Examination Report, European Application No. 08103718.6, Jun. 8, 2010, 1 page.

* cited by examiner

*Primary Examiner* — Thai Tran
*Assistant Examiner* — Sunghyoun Park
(74) *Attorney, Agent, or Firm* — Fenwick & West LLP

(57) ABSTRACT

The present invention relates to an apparatus and method for normalization of an image signal, particularly for use in perceptual video and still image quality measurement when the quality measurement is achieved by making a comparison between a reference signal and a decoded signal. The invention provides a method for normalizing a decoded image signal in relation to a reference image signal to generate a normalized image signal comprising the steps of: generating a non-linear transformation vector in dependence upon at least one component of the decoded image signal and at least one component of the reference image signal; and applying said non-linear transformation vector to at least one component of the decoded image signal to generate a normalized image signal. Methods and apparatus for perceptual video and still image quality measurement using said method are also provided.

14 Claims, 3 Drawing Sheets

METHOD AND APPARATUS FOR IMAGE SIGNAL NORMALISATION

BACKGROUND a. Field of the Invention

The present invention relates to an apparatus and method for normalisation of an image signal, particularly for use in perceptual video and still image quality measurement when the quality measurement is achieved by making a comparison between a reference signal and a decoded signal which may have been degraded during encoding, transmission and decoding processes. In the transmission of video, the different processes involved in encoding, transmission and decoding of a video signal usually introduce a gain, offset and gamma modification. Video coding may also introduce minor changes in the colour components of the source signal. Similar modifications can occur during the encoding, storage and decoding of still images. The main cause of these modifications comes from the different colour space representations used internally by different steps in an encoding, transmission/storage, decoding chain.

Video frames and still images are typically stored in one of two colour space formats: YUV and RGB. Both formats decompose the picture into three components such that each pixel is represented by three component values. In YUV format the three components are a single luminance value (Y) and two chrominance values (U and V). In RGB format the three components are Red (R), Green (G) and Blue (B). Conversion between the two formats is based on a simple first-order linear mapping. The description of the present invention will focus on its application to YUV format video frames and still images; however, a description of its application to RGB format video frames and still images is provided at the end of the detailed description.

Modifications to the brightness of a video frame or still image arise if an offset is added to or subtracted from the luminance values of pixels. Modifications to the contrast occur if the luminance value of the pixels is scaled. Changes in colour space typically arise from the linear transformations between YUV and RGB representation.

Cathode ray tube (CRT) display devices are subject to a gamma or power-law relationship between the input (electrical) signal and the light (luminance) emitted at the surface of the display such that the intensity light i produced by the CRT display is proportional to the signal input voltage v raised to a power exponent called gamma:

$$i \propto v^\gamma$$

where γ is the gamma value of the display. Digital video and still cameras produce signals in gamma-compensated form so that when the image is viewed on the display device the overall system will be linear. The gamma compensation processed can be expressed as:

$$i \propto v^{\frac{1}{\gamma}}$$

where γ is the gamma value of the expected display. Most displays have a gamma value of approximately 2.2; however, this is not guaranteed and values between 1.8 and 2.5 are not uncommon. Note that liquid crystal displays (LCD) don't have the implicit power-law relationship between the electrical signal and pixel brightness but a transfer function is generally built-in to emulate the CRT gamma relationship.

Many systems include intermediate gamma correction stages that attempt to make the end-to-end system linear. For example, some computer systems use a colour management engine to convert to a different gamma value before storing the pixel values in video memory. This means that reference and decoded signals may have been exposed to multiple, different gamma modification steps. Moreover, in systems that store images in RGB format, different gamma corrections may be applied for the different colour components of the image.

A video or still image quality measurement system using a comparison between an original (reference) and a received (decoded) signals (termed full-reference measurement) needs to allow for the fact that minor changes in brightness, contrast, colour space and gamma do not influence perceived video or image quality, and therefore needs to correct such changes in order to make an accurate perceptual quality prediction. In a case where the received signal can only be captured at a point where display settings such as brightness, contrast and gamma correction have modified the received signal, correction of the above mentioned factors also allows measurement of the video or still image quality independently from the receiver's display settings.

The present invention addresses the problem of jointly normalising the effects of brightness, contrast, colour space and gamma correction errors between a pair of matched reference and a decoded video frames or still images. This is a non-trivial task because while brightness, contrast, colour space are essentially linear transformations, gamma is a power-law transformation. The present invention solves this problem by using a third-order polynomial mapping to approximate the combined effects of brightness, contrast, colour space and gamma correction errors. The coefficients of the mapping are optimised to normalise the Y (and optionally UV) components of the decoded video frame or still image relative to the corresponding reference video frame or still image. This optimisation step is performed by finding the set of polynomial coefficients that minimise a measure of the error between the two video frames or still images.

In the following description the invention is described in the context of its application to the measurement of video quality. However, as has already been mentioned, the invention has equal application in still image quality measurement systems, and the term frame shall be understood to include both video frames and still images.

b. Related Art

Computation of gain and offset errors between two video signals is proposed in M. H. Pinson and S. Wolf "A New Standardized Method for Objectively Measuring Video Quality", IEEE Transactions on Broadcasting, vol. 50(3), pp. 312-322, September 2004. In this method, the original and processed frames are divided into small, square sub-regions, or blocks. The mean over space of the Y, U and V samples for each corresponding reference and processed sub-region are computed to form spatially sub-sampled images. A first order linear fit is used to compute the relative gain and offset between the sub-sampled original and processed frames. This linear fit is applied independently to each of the three channels: Y, U, and V. Non-linear corrections between the signals are not handled and the method makes the assumption that the different colour components (Y, U, and V) each have an independent gain and level offset. A reduced-reference approach based on the same method was also proposed by M. H. Pinson and S. Wolf "Reduced Reference Video Calibration Algorithms" www.its.bldrdoc.gov/pub/ntia-rpt/08-433b/. In the reduced-reference version, a pre-filtering step is applied to eliminate those blocks that contain a wide spread of pixel values but the principles of the method remain identical to those proposed in the original article. The method referred above for correcting gain and offset is then used in patent application no US2007088516A1 as part of a reduced-reference video quality assessment method.

None of the methods proposed in the prior art corrects problems due to gamma modification or errors due to colour space conversion when different colour space representations are used by different elements of the transmission chain.

SUMMARY OF THE INVENTION

According to the invention, there is provided a method of normalising a decoded image signal in relation to a reference image signal to generate a normalised image signal comprising the steps of: generating a non-linear transformation vector in dependence upon at least one component of the decoded image signal and at least one component of the reference image signal; and applying said non-linear transformation vector to at least one component of the decoded image signal to generate a normalised image signal.

Preferably, the non-linear transformation vector is generated in dependence on at least one third order polynomial mapped decoded image component.

In a preferred embodiment, an image signal comprises a plurality of components and the non-linear transformation vector is generated in dependence on a plurality of decoded image components and in dependence on a single reference image component.

An image signal may comprise a luminance component and two chrominance components in which case the non-linear transformation vector may be generated in dependence upon the luminance and two chrominance components of the decoded image signal and the luminance component of the reference image signal; and by applying said non-linear transformation vector to the luminance component of the decoded image signal to generate a normalised image signal.

The non-linear transformation vector may be generated by minimising a root mean square error between a plurality of decoded image components having the non-linear transformation vector applied and a reference image component; the root mean square error may be minimised using singular value decomposition.

A normalised image signal may be generated from a reference image signal and a decoded image signal and used in a method of image quality assessment by generating an image quality measure in dependence upon a comparison between the reference image signal and the normalised image signal The method of video signal quality assessment may comprise generating a video signal quality measure in dependence upon a plurality of image quality measures relating to a plurality of image frames and said quality measure may be stored for visual display and analysis.

An apparatus, a computer program and a computer readable medium carrying a computer program for performing the method of the invention are also provided.

DETAILED DESCRIPTION

Figure 1:
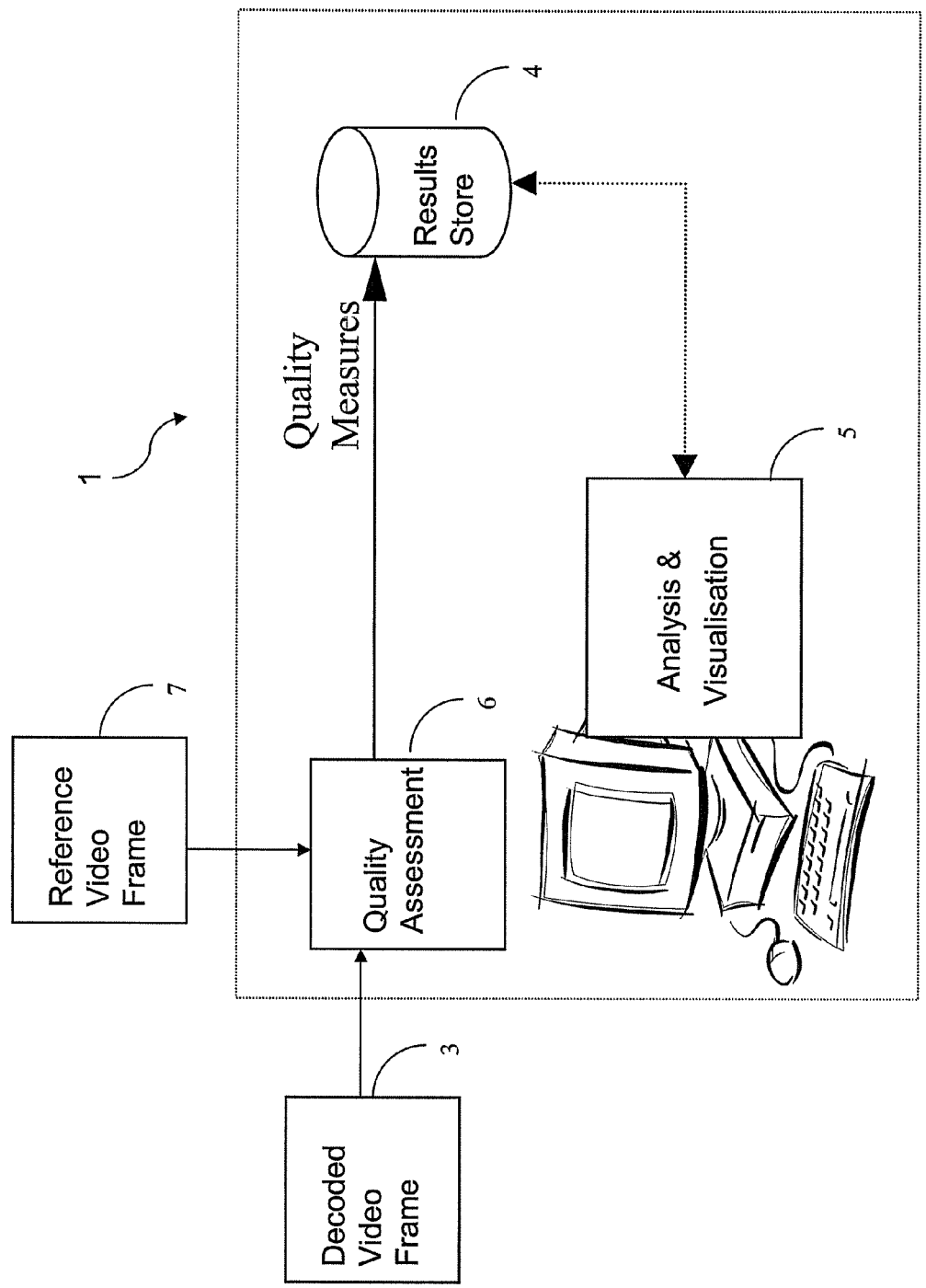
FIG. 1 is an illustration of a 'full-reference' video quality assessment system.

A 'full-reference' video quality assessment system is described as such because a decoded frame 3 is analysed alongside a reference frame 7 by a quality assessment system 6.

An original video signal is encoded and transmitted via a telecommunications channel. The decoded frame 3 is selected from a received decoded signal and the reference frame 7 is selected from the original video signal. It is assumed that reference and processed video signals are spatially and temporally aligned prior to comparison of the reference frame 7 and the decoded frame 3. If necessary pre-processing steps are carried out to achieve spatial and temporal alignment. However, these steps are not relevant to the invention and are not discussed further here.

Quality assessment results which depend upon a comparison of the decoded frame 3 and the reference frame 7 are stored in a data store 4 for use in an analysis and visualisation module 5.

Figure 2:
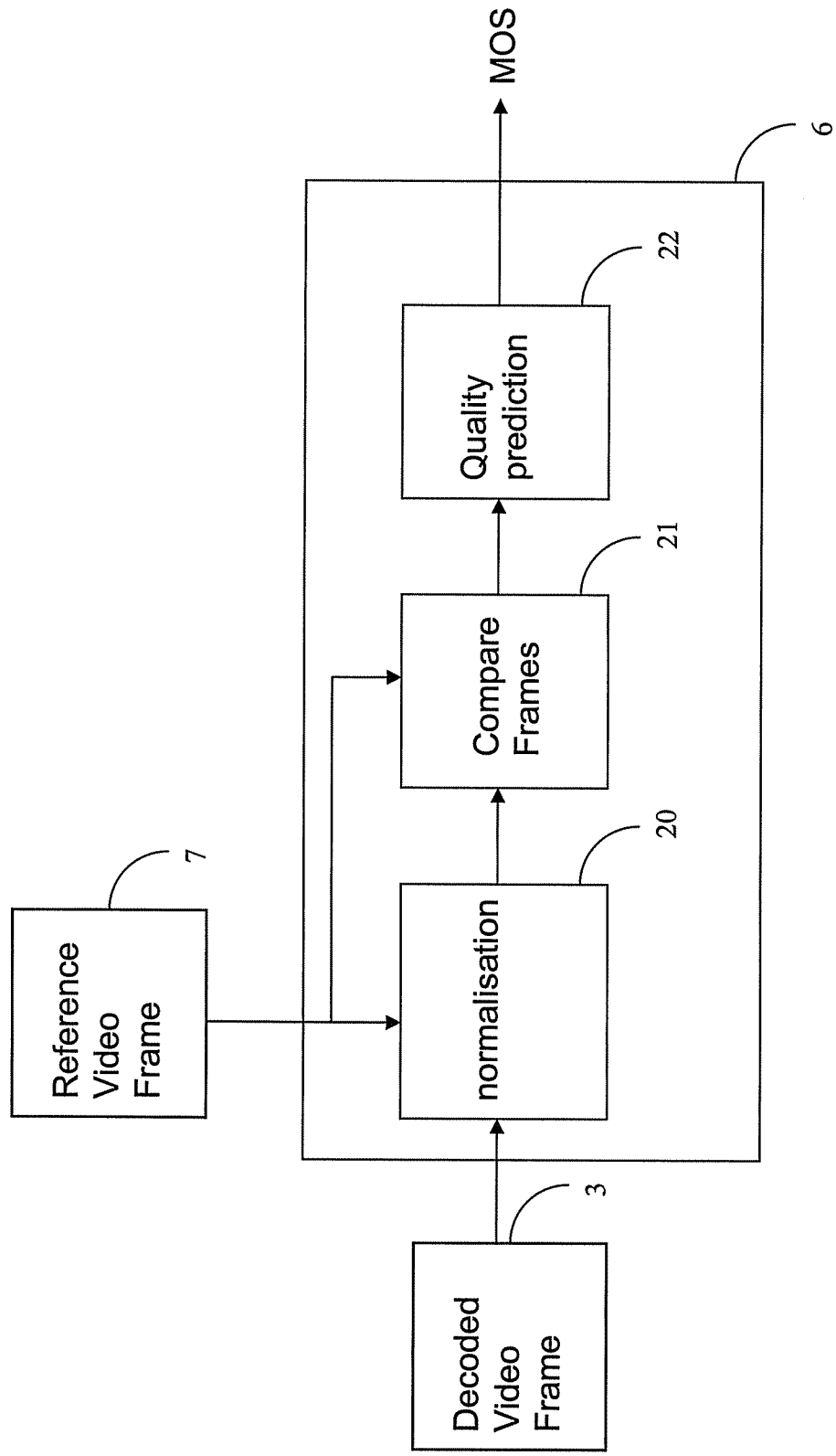
FIG. 2 is a block diagram illustrating the quality assessment module of FIG. 1 in more detail.

FIG. 2 illustrates the processes carried out by the quality assessment system 6 in more detail. Normalisation module 20 normalises the decoded frame. In this context, the term 'normalisation' refers to the problem of modifying colour space components in the decoded video signal in order to correct differences in gain, offset, gamma and differences due to colour space conversion when different colour space representations are used by different elements of the encoding, transmission and decoding chain. Comparison module 21 compares the normalised decoded frame with the reference frame to generate a set of relevant features. The features are then used by quality prediction module 22 to generate a mean opinion score (MOS).

Quality prediction models typically produce a set of intermediate parameters from the input signal (or signals in the case of a full-reference model) such that each parameter changes in response to the presence and severity of one or more classes of image impairment. Said intermediate parameters are then combined to produce a single quality prediction value that correlates with the mean opinion score (MOS) that would be obtained for the decoded input signal when assessed by human subjects in a subjective experiment. The parameter combination step can be a simple weighted sum. Methods for optimising the relative weights of the parameters, like multi-variable regression, are well known to those skilled in the art and are not directly relevant to the present invention. An example of a video quality prediction model that uses an intermediate set of parameters as described above is provided in Annex A of ITU-T Recommendation J.144, "Objective perceptual video quality measurement techniques for digital cable television in the presence of a full reference", with the weighted sum of the parameters performed according to Equation A.4-2. ITU-R Recommendation BT-500, "Methodology for the subjective assessment of the quality of television pictures" describes methods of performing subjective experiments for video signals.

Figure 3:
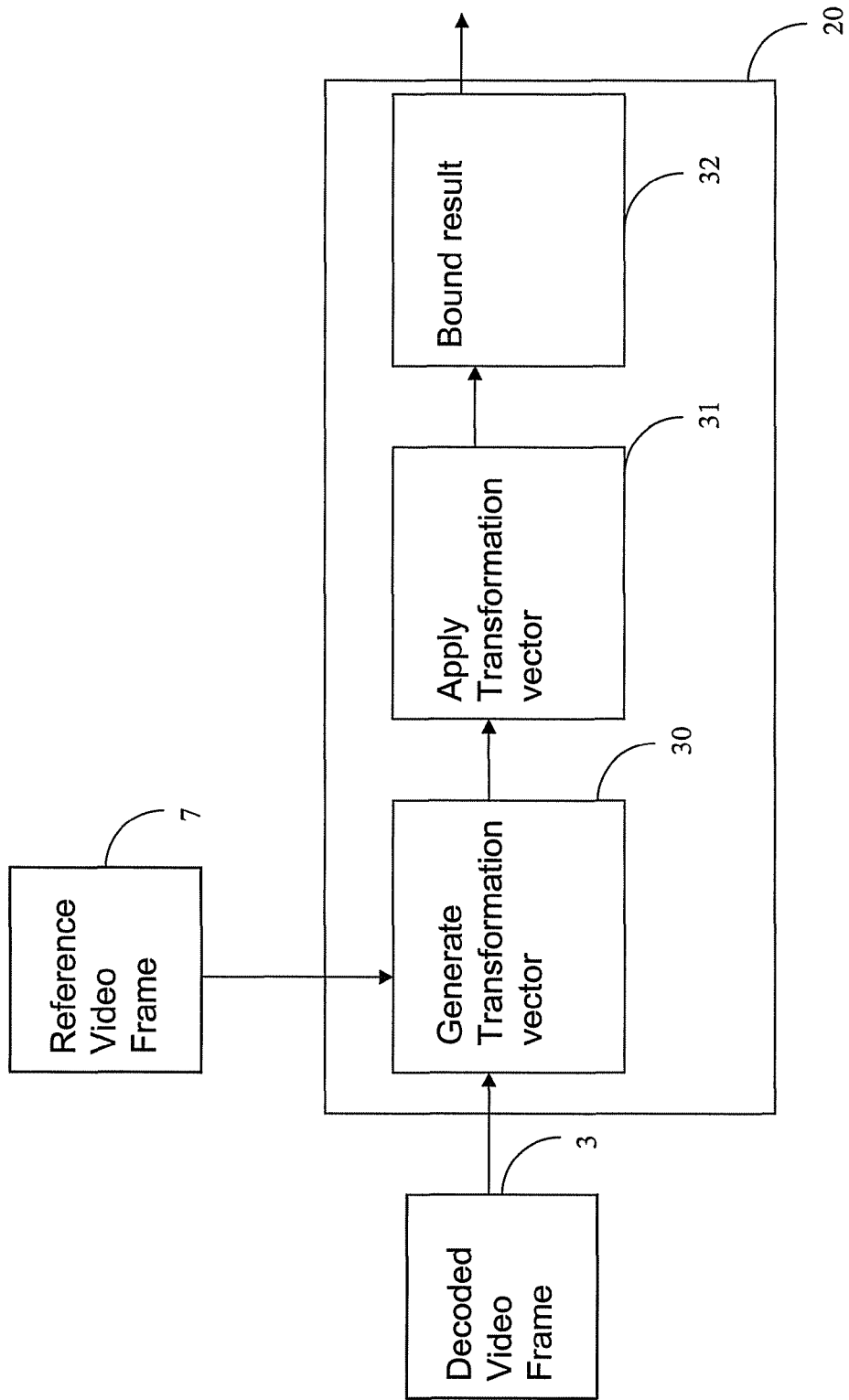
FIG. 3 illustrates the steps to be carried out by a normalisation module in accordance with the present invention.

The normalisation of the decoded video signal in accordance with the reference signal will now be described in more detail, with reference to FIG. 3.

Normalisation is performed by modifying the luminance (Y) and chrominance (U and V) components of the decoded frame in relation to the YUV components of the reference frame. Colour space adaptation is computed for each pair of aligned reference and decoded frames.

A transformation vector is computed at step 30 by solving a Linear Least Squares (LLS) problem using Single Value Decomposition (SVD). Those skilled in the art will understand that there are many ways of solving a Linear Least Squares problem, for example QR factorisation where the matrix is decomposed into an orthogonal and a triangular matrix, complete orthogonal factorisation, divide and conquer SVD to name but a few.

In the preferred embodiment of the invention SVD is used to minimise the root mean square error between the components of the decoded image signal having a third-order polynomial mapping applied and the components of the reference signal as described below.

Minimise $\|Ax-b\|_2$ over $x$ where $Ax = b$ $\Leftrightarrow$ $$\begin{pmatrix} Yd_1^3 & Ud_1^3 & Vd_1^3 & Yd_1^2 & Ud_1^2 & Vd_1^2 & Yd_1 & Ud_1 & Vd_1 & 1 \\ \ldots & \ldots & \ldots & \ldots & \ldots & \ldots & \ldots & \ldots & \ldots & \ldots \\ Yd_N^3 & Ud_N^3 & Vd_N^3 & Yd_N^2 & Ud_N^2 & Vd_N^2 & Yd_N & Ud_N & Vd_N & 1 \end{pmatrix} \begin{pmatrix} x_1 \\ \ldots \\ x_{10} \end{pmatrix} = \begin{pmatrix} Yr_1 \\ \ldots \\ Yr_N \end{pmatrix}$$

and where $\|v\|_2$ denotes the L2-norm (which is s well known term of the art) of vector v, i.e. $\|v\|_2 = \sqrt{v_1^2 + v_2^2 + \ldots + v_N^2}$, $(Yd_k Ud_k Vd_k)$ are the YUV component values of pixel k in the decoded image, $Yr_k$ is the Y component value of pixel k in the reference image, and vector x contains the third-order polynomial coefficients.

In a preferred embodiment the transformation vector $(x_1, \ldots x_{10})$ is computed using pixels of a sub-resolution image obtained by a linear spatial sampling (or sub-sampling) of the input image in horizontal and vertical directions, for example, sampling by a factor of 4 of a 176×144 input reference and decoded images creates a 44×36 sub-resolution image.

The luminance value in the decoded frame is then modified using the transformation vector at step 31:

$$\begin{pmatrix} Y_{o1} \\ \ldots \\ Y_{oN} \end{pmatrix} = \begin{pmatrix} Y_{i1}^3 & U_{i1}^3 & V_{i1}^3 & Y_{i1}^2 & U_{i1}^2 & V_{i1}^2 & Y_{i1} & U_{i1} & V_{i1} & 1 \\ \ldots & \ldots & \ldots & \ldots & \ldots & \ldots & \ldots & \ldots & \ldots & \ldots \\ Y_{iN}^3 & U_{iN}^3 & V_{iN}^3 & Y_{iN}^2 & U_{iN}^2 & V_{iN}^2 & Y_{iN} & U_{iN} & V_{iN} & 1 \end{pmatrix} \begin{pmatrix} x_1 \\ \ldots \\ x_{10} \end{pmatrix}$$

where $(Y_{ik}U_{ik}V_{ik})$ are the YUV component values of pixel k in the decoded image before transformation and $Y_{ok}$ is the resulting Y component value of pixel k after adaptation.

Finally, the luminance component value is bound at step 32 to its original allowed range, which is typically [0,255]:

$Y_{ok}' = \min(\max(Y_{ok},0),255)$

In the preferred embodiment, the normalisation process described above is applied to the chrominance components (U and V) of the decoded frame too. However, in an alternative embodiment the normalisation is only applied to the luminance component because this will perform the bulk of the desired normalisation process.

The preceding description illustrates how the normalisation process can be applied to a pair of frames stored in YUV format. In another embodiment the normalisation process is applied to each of the Red, Green, Blue (RGB) components of a frame stored in RGB format. This will have a very similar effect to normalising the Y, U and V components in YUV format as the two formats are linearly related.

It will be understood by those skilled in the art that the processes described above may be implemented on a conventional programmable computer, and that a computer program encoding instructions for controlling the programmable computer to perform the above methods may be provided on a computer readable medium.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention as defined in the following claims.

The invention claimed is:

1. A method of normalizing a decoded image signal in relation to a reference image signal to generate a normalized image signal comprising the steps of:
    generating a non-linear transformation vector in dependence upon at least one component of the decoded image signal, at least one component of the reference image signal, and at least one third order polynomial mapped decoded image component, the non-linear transformation vector generated through use of linear least squares;
    applying said non-linear transformation vector to at least one component of the decoded image signal to generate the normalized image signal; and
    generating an image quality measure based on a comparison between the reference image signal and the normalized image signal.

2. A method according to claim 1, in which an image signal comprises a plurality of components and the non-linear transformation vector is generated in dependence on a plurality of decoded image components and in dependence on a single reference image component.

3. A method according to claim 2, in which an image signal comprises a luminance component and two chrominance components.

4. A method according to claim 3, in which the non-linear transformation vector is generated in dependence upon the luminance and two chrominance components of the decoded image signal and the luminance component of the reference image signal; and
    applying said non-linear transformation vector to the luminance component of the decoded image signal to generate a normalized image signal.

5. A method according to claim 1, in which the non-linear transformation vector is generated by minimizing a root mean square error between a plurality of decoded image components having the non-linear transformation vector applied and a reference image component.

6. A method according to claim 5 in which the root mean square error is minimized using singular value decomposition.

7. A method according to claim 1, in which components of the normalized image signal are bound within a predefined range.

8. A method according to claim 1, in which the or each component of the degraded signal and the or each component of the reference signal are subsampled prior to generating the non-linear transformation vector.

9. A method of video signal quality assessment comprising the step of generating a video signal quality measure in dependence upon a plurality of image quality measures relating to a plurality of image frames in the video signal, said image quality measures being determined according to claim 1.

10. A method according to claim 1, further comprising the step of storing the quality measure for visual display and analysis.

11. A non-transitory computer readable medium storing a computer program for implementing the method according to claim 1.

12. An apparatus for video quality assessment comprising:
a processor for generating a quality measure;
a store for storing the quality measure;
wherein the processor is arranged in operation to generate the quality measure in accordance with claim 1.

13. An apparatus according to claim 12, further comprising an analysis module for analyzing and visualizing the quality measure.

14. A method of normalizing a decoded image signal in relation to a reference image signal to generate a normalized image signal comprising the steps of:
generating a non-linear transformation vector in dependence upon at least one component of the decoded image signal and at least one component of the reference image signal, the decoded image signal and the reference image signal comprising a plurality of components, the non-linear transformation vector generated through use of linear least squares and in dependence on a plurality of decoded image components and on one of the reference image components;
applying said non-linear transformation vector to at least one component of the decoded image signal to generate the normalized image signal; and
generating an image quality measure based on a comparison between the reference image signal and the normalized image signal.

* * * * *